United States Patent
Stettes

(10) Patent No.: US 7,885,520 B2
(45) Date of Patent: Feb. 8, 2011

(54) DUAL ELEMENT HEATER ELEMENT FOR VENDING APPARATUS AND METHOD THEREFOR

(75) Inventor: Gregory G. Stettes, Pacific, MO (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 738 days.

(21) Appl. No.: 11/981,778

(22) Filed: Oct. 30, 2007

(65) Prior Publication Data

US 2008/0163760 A1 Jul. 10, 2008

Related U.S. Application Data

(60) Provisional application No. 60/879,642, filed on Jan. 10, 2007, provisional application No. 60/879,741, filed on Jan. 10, 2007, provisional application No. 60/879,754, filed on Jan. 10, 2007, provisional application No. 60/879,757, filed on Jan. 10, 2007.

(51) Int. Cl.
*H05B 3/60* (2006.01)
*B67D 7/80* (2010.01)

(52) U.S. Cl. .................... 392/318; 222/146.1

(58) Field of Classification Search ................ 392/318, 392/311–338; 222/146.1, 145.6–146.6
See application file for complete search history.

(56) References Cited

U.S. PATENT DOCUMENTS

| 4,722,267 | A | * | 2/1988 | Galockin et al. | ............... 99/357 |
| 5,579,952 | A | * | 12/1996 | Fiedler et al. | ........... 221/150 A |
| 6,822,204 | B2 | * | 11/2004 | Clothier | ....................... 219/528 |
| 2004/0065658 | A1 | * | 4/2004 | Damiano et al. | ............ 219/524 |

* cited by examiner

*Primary Examiner*—Daniel Robinson

(57) ABSTRACT

A dual heater element for heating a liquid for use in a vending apparatus is provided. The heater element includes two elements. A first heating element is operable for use at a conventional first operating voltage or range (e.g., 120 VAC) while a separate second heating element is operable for use with a conventional second operating voltage or range (e.g., 230 VAC). A first pair of terminals coupled to the first heating element and a second pair of terminals coupled to the second heating element are selectively and/or interchangeably connected to a pair of line voltage terminals. The configuration of the line voltage electrical system and the use of a heater element with dual elements each operating (normal operation) at different voltages or voltage ranges allows the vending apparatus to be manufactured without variation in components and enables dual voltage source operation for two different line voltages (e.g., line voltage supply is either 120 VAC or 230 VAC).

20 Claims, 14 Drawing Sheets

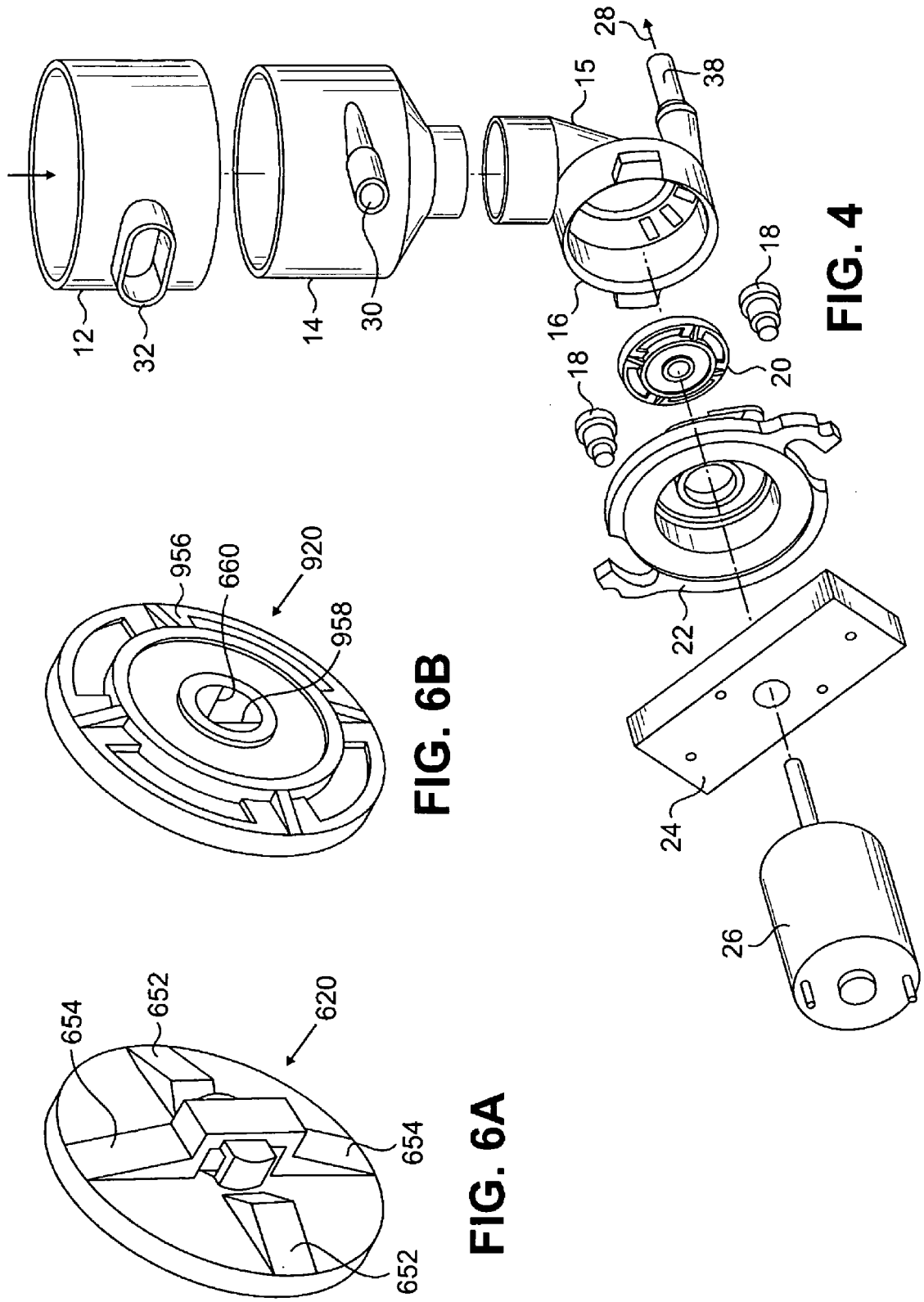

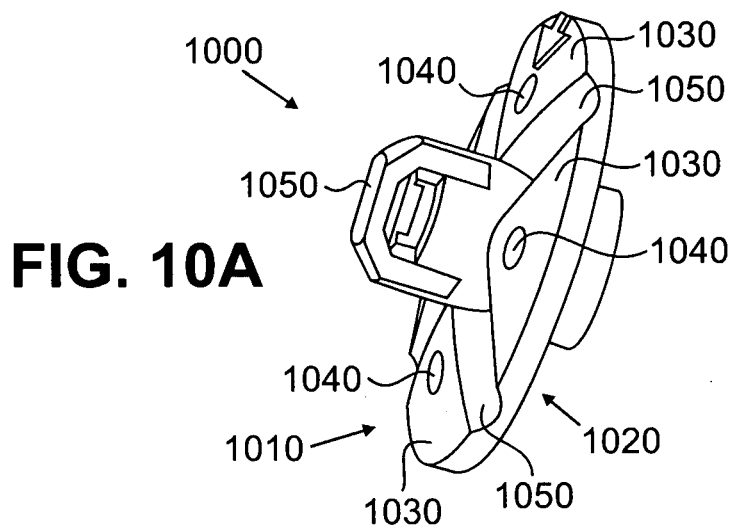
FIG. 10A
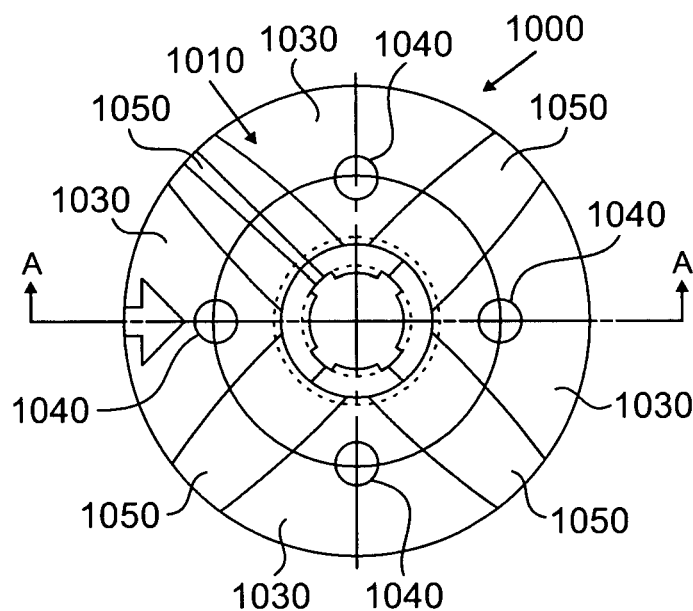
FIG. 10B
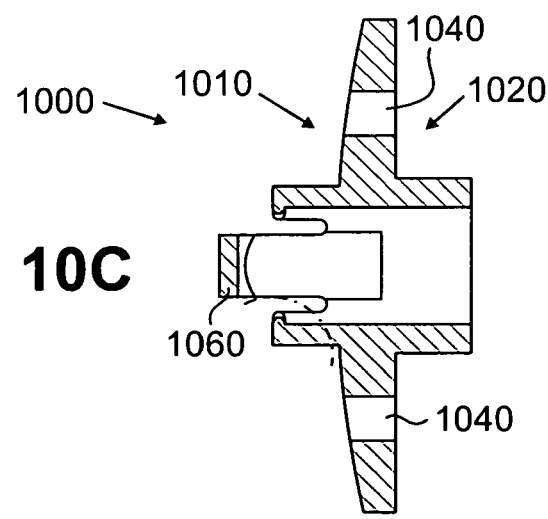
FIG. 10C

DUAL ELEMENT HEATER ELEMENT FOR VENDING APPARATUS AND METHOD THEREFOR

CROSS-REFERENCE TO RELATED APPLICATION

This application claims priority under 35 USC 119(e) to U.S. provisional Application Ser. No. 60/879,642 filed on Jan. 10, 2007, U.S. provisional Application Ser. No. 60/879,757 filed on Jan. 10, 2007, U.S. provisional Application Ser. No. 60/879,741 filed on Jan. 10, 2007 and U.S. provisional Application Ser. No. 60/879,754 filed on Jan. 10, 2007, and which are incorporated herein by reference.

TECHNICAL FIELD

The present invention relates generally to a beverage vending or dispensing apparatus, and more particularly to a dual element heater element to heat liquid for use in producing a heated beverage.

BACKGROUND

Many consumers purchase hot beverages from vending machines. These vending machines often contain a variety of coffee and chocolate drinks as well as other hot drinks. Often, specialty drinks such as lattes, cappuccinos or espressos are served in the vending machines.

Some prior art vending machines mix a dry beverage mix and hot water in a cup located in a general receiving area by adding the hot water to the dry mix and allowing the agitation from the pouring action of the hot fluid to dissolve the mixture into the fluid. While this usually dissolves simple soluble mixes, the pouring action is insufficient to thoroughly dissolve a more complex mix, thereby leaving a residue of mix at the bottom of the cup. Additionally, this method does not provide for a frothing action to produce a creme that is common to such drinks as lattes, cappuccinos or espressos.

Other prior art vending machines mix the dry beverage mix and the hot water within the vending machine. These machines provide some sort of mixing chamber in the vending machine to aid in ensuring that the mix is properly dissolved into solution. However, these previous mixing apparatuses have been unable to provide a sufficient froth that might compare to such beverages obtained from a conventional coffee vending merchant. Specifically, the prior art used a smooth mixing chamber and a stirring mechanism such as an impeller to stir the mix. However, this method also failed to provide the agitation sufficient to produce a suitable froth or creme.

In some of these beverage dispensing machines, the dry beverage mix is held within a product container or canister. Traditionally, such a dry mix product container used to dispense dry mixes or products, such as coffee, premix (e.g., chocolate, cappuccino, French vanilla, or other dry products) utilizes a single mixing wheel agitator to keep the product loose and lifted. However, in such containers, the product gram throw is not consistent as the level of product in the product container is reduced.

Prior art vending machines are typically designed to operate within a specific input operating voltage (or range). The two most common input voltages are 120 VAC and 230 VAC. In most cases, this does not present a problem, however when the vending machine requires hot water and utilizes a hot water tank therein, problems arise. Notably, the vending machine must be manufactured with a hot water heater element operable for the desired input voltage. Thus, in these cases, two fairly different machines are manufactured under different model or part numbers. This disadvantageously only allows a given vending machine to be utilized for a specific input voltage. As a result, multiple models of the same machine are manufactured for each input voltage range, and when manufactured to one input voltage, additional extensive modifications are usually necessary to convert the vending machine to utilize another input voltage.

When different cup sizes are available for dispensing of beverages from a beverage vending apparatus, prior art selection processes and user interfaces have generally required that the customer input the desired size of the cup. This complicates the customer selection process and can cause and additional problems when a customer inputs one size of cup to the vending apparatus, but places a smaller size cup in the receiving area (overflow and spillage). Furthermore, if multiple cup sizes are desired, this requires additional input means, such as additional user interface buttons and logic.

Accordingly, there are needed improved methods, systems and apparatus for mixing a dry product mix and liquid within a vending machine or beverage dispenser to produce a mixed liquid having an improved and suitable froth or creme. Also, there is needed an improved dry product container and dispensing method for dispensing the dry product that increases product gram throw consistency during dispensing. Additional manufacturing efficiencies and vending machines are needed to allow a particular vending machine to operate using one of multiple common input operating voltages with little or no modification necessary when a particular one of the input voltages will be used. Further, there is needed a customer selection process, method and vending apparatus that automatically detects a size of a cup desired to receive the dispensed beverage for simplifying the selection process and reducing potential problems associated with manual customer inputting of a cup size to the vending apparatus.

SUMMARY

In accordance with one embodiment, there is provided a heating apparatus for use in a vending machine. The heating apparatus includes a pair of power supply terminals operable for receiving an operating line voltage for use in providing power to the vending machine. The apparatus further includes a first heating element having a first pair of electrical conductors and rated for operation at a first operating voltage, a second heating element having a second pair of electrical conductors and rated for operation at a second operating voltage, and a means for selectively coupling the pair of power supply terminals to a one of: the first pair of electrical conductors when the vending machine is intended to use the first operating voltage as the operating line voltage and the second pair of electrical conductors when the vending machine is intended to use the second operating voltage as the operating line voltage.

In accordance with another embodiment, there is provided a method of manufacturing a vending machine apparatus. The method includes providing a pair of power supply terminals operable for receiving an operating line voltage for use in providing power to the vending machine, providing a first heating element having a first pair of electrical conductors and operable at a first operating voltage, and providing a second heating element having a second pair of electrical conductors and operable at a second operating voltage. The pair of power supply terminals is selectively coupled to a one of: the first pair of electrical conductors when the first operating voltage is to be used as the operating line voltage and the second pair of electrical conductors when the second operating voltage is to be used as the operating line voltage.

In yet another embodiment, there is provided a vending apparatus for providing a heated beverage. The vending apparatus system includes a pair of input line voltage terminals operable for receiving power from an external voltage source, a tank for holding a liquid and a heater disposed at least partially within the tank for heating the liquid in the tank. The heater includes a first heating element having a first pair of electrical conductors and a second heating element having a second pair of electrical conductors. The apparatus further includes a mixing chamber for mixing a portion of the liquid from the tank and a beverage mix to generate a heated beverage, and an outlet for dispensing the heated beverage into a receptacle. When the external voltage source is within a first operating voltage range the pair of input line voltage terminals are coupled to the first pair of electrical conductors of the first heating element and the second pair of second pair of electrical conductors of the second heating element are not coupled to the input line voltage terminals or any other power source.

In still another embodiment, there is provided a vending system for providing a heated beverage. The vending system includes a customer input system for receiving a customer input for the heated beverage, a dry beverage mix product dispensing apparatus storing dry beverage mix therein and operable for dispensing a predetermined portion of the dry beverage mix, a tank for holding a liquid, a mixing chamber for mixing a portion of the liquid from the tank and the dispensed dry beverage mix portion into a heated beverage, and a discharge outlet from the mixing chamber to dispense the heated beverage into a customer receptacle. The vending system further includes a pair of power supply terminals for receiving an operating line voltage for use in providing power to the vending system, and a heater apparatus for heating liquid in the tank. The heater apparatus includes a first heating element having a first pair of electrical conductors for operation at a first operating voltage, a second heating element having a second pair of electrical conductors for operation at a second operating voltage, and means for selectively coupling the pair of power supply terminals to a one of: the first pair of electrical conductors when the operating line voltage substantially equals the first operating voltage and the second pair of electrical conductors when the operating line voltage substantially equals the second operating voltage.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates more detailed diagram of the mixing and whipping chambers;

FIGS. 6A and 6B illustrate the mixing chamber side and the motor side, respectively, of one embodiment of an impeller in accordance with the present disclosure;

FIGS. 10A, 10B and 10C, illustrate a front (chamber side) perspective view (FIG. 10A), a front (chamber side) view (FIG. 10B) and a cross-sectional view (FIG. 10C) along line A-A of FIG. 10B, of another embodiment of an impeller in accordance with the present disclosure;

DETAILED DESCRIPTION

The present disclosure describes a device that whips an unwhipped fluid/dry beverage mix or fluid slurry into a whipped, mixed beverage. Upon receiving the unwhipped fluid slurry into a whipping chamber, an impeller rotates at sufficient speed such that cavitations are created near indentations located in the wall of the whipping chamber. The cavitations are caused by a low pressure region near the interface between the indentations and the chamber wall, resulting in greater fluid mixing and creating a foaming or frothing action within the fluid. The froth is desirable when the fluid is intended to be a hot, whipped beverage such as hot chocolate or a specialized coffee drink.

The present disclosure further describes a dry product dispenser container having multiple agitators to maintain the dry product within the dispenser in a loose and lifted state. The use of multiple agitators distributes the product more evenly for a more consistent product throw and evacuation. This increases the effective product capacity thereby reducing the service frequency for refill.

The present disclosure additionally describes a hot water tank heater element and system that is capable of operating using two different voltage ranges (e.g. 120 VAC and 230 VAC ranges). The heater element includes multiple separate elements—one operable at a predetermined wattage using 120 VAC and one operable at a predetermined wattage using 230 VAC. This allows vending machines (that include hot water tanks) to be assembled without variations in the manufacturing line, and a customer may use the same vending machine (with minor modification) whether the power source is 120 VAC or 230 VAC.

The present disclosure also describes methods and apparatus for detecting placement of a cup within the dispensing area (to receive a dispensed beverage into the cup) and differentiation between cup sizes. Upon detection of the cup placement and/or cup size, feedback is provide to the customer via keypad or pushbuttons to indicate all the available selections (e.g., not available because drink is "sold out" or unavailable for the cup size selected), and after selection, indicating the actual chosen selection. For multiple cup size vending machines, the customer no longer needs to select cup size as per the traditional drink selection process—the customer simply places the cup (the size of cup chosen by the customer), chooses the drink selection, and the vending machine automatically fills the cup with the appropriate amount.

Figure 1:
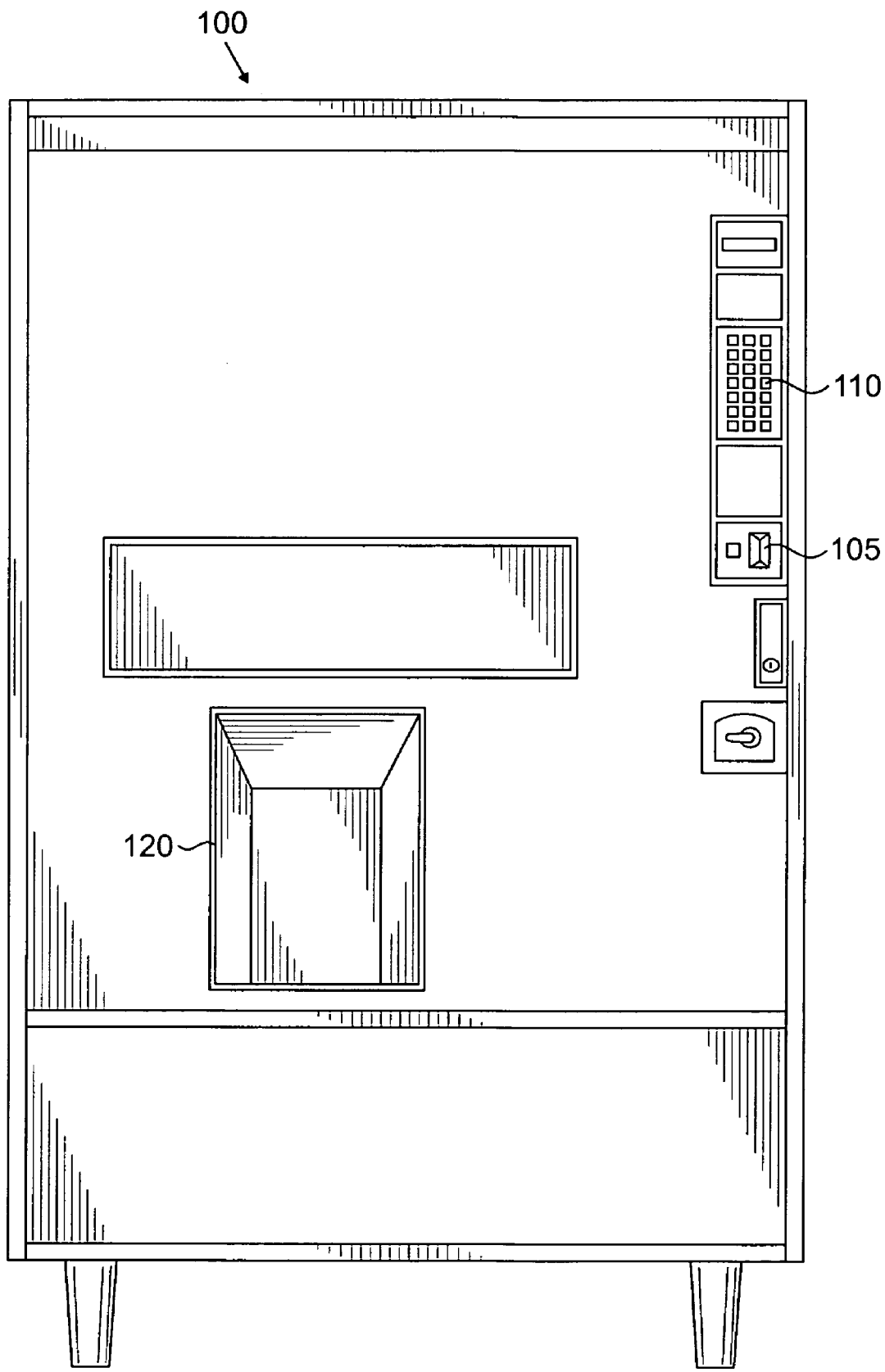
FIG. 1 illustrates the exterior of a typical beverage dispenser in which the subject matter of the present disclosure may be utilized.

Now turning to FIG. 1, there is illustrated an exterior view of a typical beverage dispenser or vending apparatus 100 in which the methods, apparatus and systems of the present disclosure may be utilized. Other dispenser or vending apparatus and configurations may be provided which may include additional, fewer and/or different components and elements.

During a typical vend operation, a customer will insert coins (or bills or their equivalent) into a slot 105 and select a particular type of drink using a selection means or apparatus 110. As will be appreciated, the slot 105 may be in the form of a paper bill acceptor or equivalent or similar device. Other devices may be included to accept payment from the customer (e.g., credit/debit card slot, etc.). It will be understood that a typical vend operation may also include a free vending/dispensing (no payment required) and/or payment at a different location (such as a counter, before or after vending). In such cases, no payment system will or needs to be included with the vending apparatus and may be omitted.

The selection apparatus 110 is shown in the form of an alpha-numeric keypad 110, however other components/forms and methods of customer selection may be utilized, including a set of push-buttons, a touchscreen, and the like. Other input devices may be utilized. When the vending apparatus is in the form of a mixed beverage dispenser, once the drink is selected, the beverage is mixed utilizing the methods and apparatus described herein and the whipped drink is dispensed into a container/cup positioned in the beverage receiving area 120, where the customer retrieves the beverage from the vending apparatus (beverage dispenser) 100. Other types of vending apparatus or dispensers may be utilized, wherein various products (drinks, candy, snacks, etc.) may be dispensed.

Figure 2:
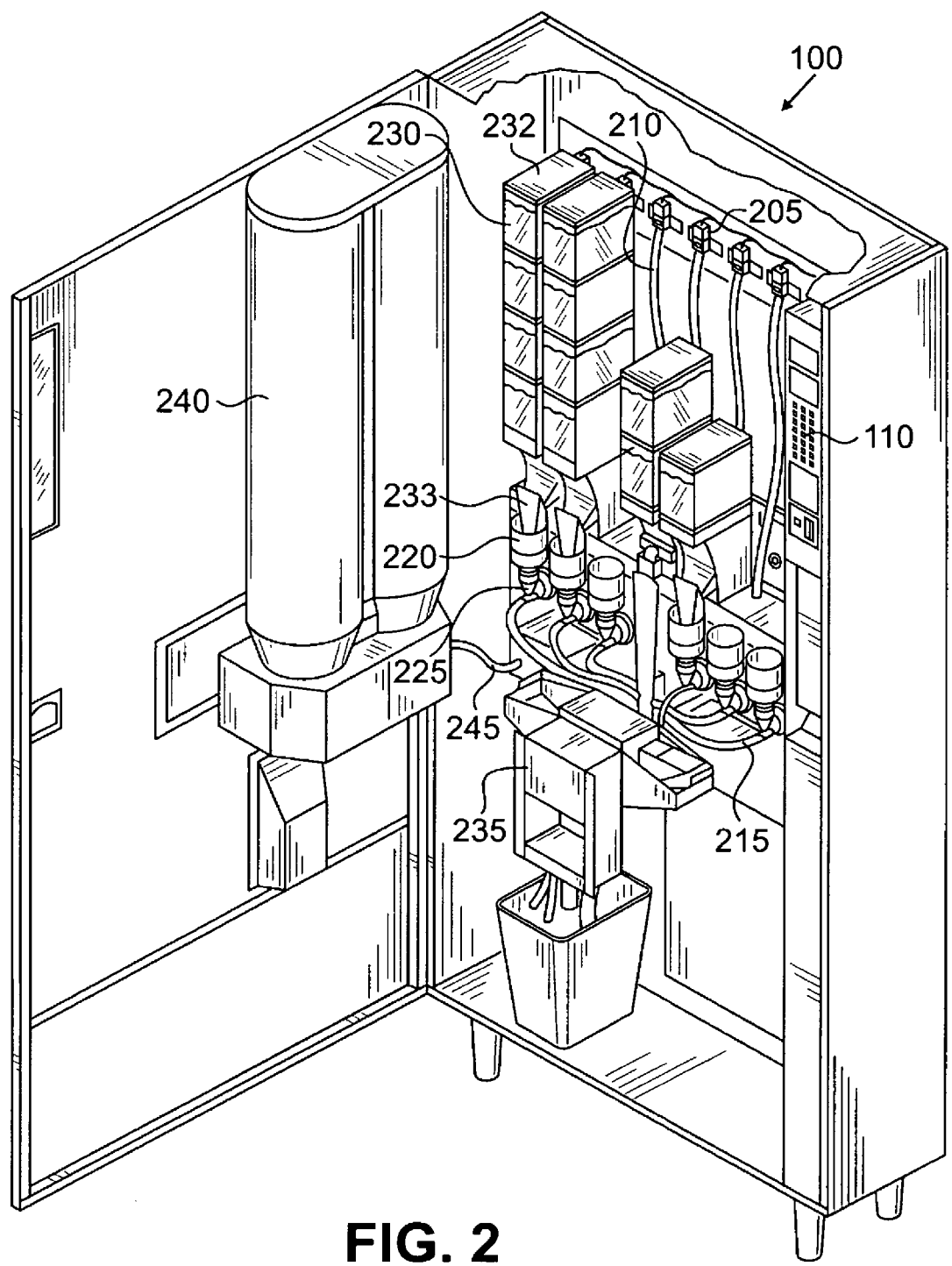
FIG. 2 illustrates the interior of a typical beverage dispenser shown in FIG. 1.

Now turning to FIG. 2, there is shown the interior of the beverage dispenser 100. The beverage dispenser 100 includes a beverage mix 230 stored within a beverage mix container 232. In one embodiment, the beverage mix 230 is a dry mix, but in other embodiments, the beverage mix may be a wet mix, pre-mix slurry, and the like. When a customer places an order for a beverage using the selection apparatus 110, a beverage cup corresponding to the selected beverage is delivered from a cup storage unit 240 into a drink dispensing area 235. Alternatively, the customer may obtain a cup from a cup dispenser or other area located adjacent or external (not shown) to the vending apparatus 100 and positions the cup in the drink dispensing area 235. This alternative arrangement is described in more detail further below.

Figure 3:
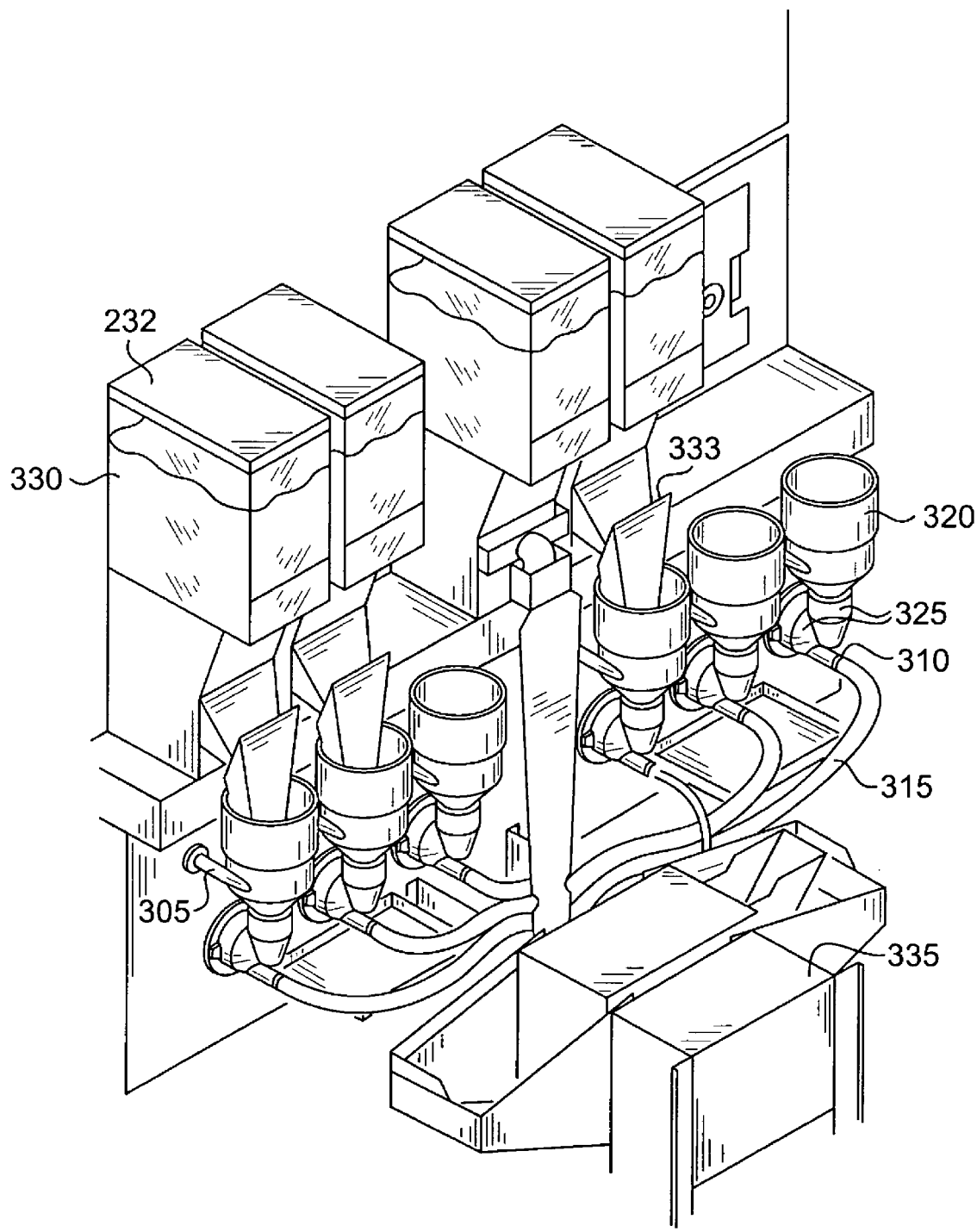
FIG. 3 illustrates a close up view of the mixing area and whipping chambers.

An electronic controller (not specifically shown in FIG. 2) ports hot water from the water storage tank (not shown) within the dispenser 100 into a mixing chamber 225 through line 305 (see FIG. 3). The beverage mix 230 is also delivered to the mixing chamber 225 and mixed therein with the hot water. As will be appreciated, liquids other than hot water, or liquids in addition to hot water, may be delivered into the mixing chamber 225.

In one embodiment, prior to the hot water entering the mixing chamber 225, an impeller 20 (see FIG. 4) therein is activated and begins to rotate. The impeller 20 rotates prior to the beverage mix 230 porting into the mixing chamber 225, 325 and the initial in-rush of hot water provides for a "washing" action within the mixing chamber 225. After the first in-rush of hot water, the beverage mix 230 corresponding to the selected beverage is delivered from the beverage mix storage container 232 into a whipping chamber inlet 220 via a chute 233. The chute 233 collects and directs the beverage mix 230 into the inlet 220 thereby preventing the beverage mix 230 from spraying or spilling into the main components of the dispenser 100. When the beverage mix 230 enters the mixing chamber 220 and comes into contact with the hot water and the impeller 20 within the whipping chamber 225, it becomes an unwhipped fluid slurry. As the unwhipped fluid slurry is stirred by the impeller 20, pressure is generated within the whipping chamber 225 and the mixed fluid is discharged through an output hose or line 215 into the waiting cup in the beverage dispenser 235. When output, the mixed fluid is now a whipped fluid slurry.

FIG. 3 illustrates a close up view of the mixing area and the whipping chamber. The dry beverage mix 330 (identified by reference numeral 230 in FIG. 2) is guided into the whipping chamber inlet 320 (220 in FIG. 2) by the product chute 333 (233 in FIG. 2). As described above, hot water enters the mixing chamber 220 via the port 305. The impeller 20 begins to rotate upon receiving an order and when the mix and water or the unwhipped fluid slurry enters the whipping chamber 325 (225 in FIG. 2), the impeller (not visible here) begins to stir or whip the unwhipped fluid slurry into a whipped or mixed combination. The mixed combination is discharged through discharge tube 315 (215 in FIG. 2). The discharge tube 315 carries the mixed fluid slurry into the beverage receiving area 335 (235 in FIG. 2) for the customer to receive the ordered beverage. Depending on the drink associated with the particular mix, a restrictor 310 may be added to the outlet of the whipping chamber 325, or placed along the discharge tube 315 to generate back pressure in the whipping chamber 325. As will be shown later, this back pressure will cause a greater formation of creme to occur.

Now turning to FIG. 4, there is shown a more detailed diagram of the mixing and whipping chambers and various component parts. The beverage mix 230, 330 enters the mixing chamber 225, 325 through the chute 233, 333 into an exhaust vent cap 12. An exhaust port 32 is provided to allow excess steam from the hot water/impeller action to escape from the chamber away from the dry mix and the chute 233, 333. This reduces caking of the beverage mix 230, 330 at or near the chute area.

A mixing bowl 14 is located directly underneath the exhaust cap 12. Hot water enters via the line 305 through a water inlet 30 and combines with the dry beverage mix 230, 330 in the mixing bowl 14 which becomes the unwhipped fluid slurry. The unwhipped fluid slurry then enters into the whipping chamber 16 (225, 335 in FIGS. 2 and 3) through an inlet 15 via both gravity and a vacuum drag created by the impeller operation in the whipping chamber 16. As will be appreciated, the inlet 15 may be considered a portion of the whipping chamber 16.

Though the mixing bowl 14 and whipping chamber 16 are shown in the Figures as separate components, they may be combined into a single component (constructed of polypropylene or other suitable material) and provide the same functions as the two separate components.

As the unwhipped fluid slurry enters the whipping chamber 16, the water and dry beverage mix are whipped or stirred by the impeller 20. The impeller 20 is connected to a whipper motor 26 through a hole in a mounting block 24 and a mounting base 22. The mounting base 22 creates a seal with the motor 26 (and its shaft) and the whipping impeller 20. Two screw caps 18 are inserted into the mounting block 24 in order to firmly attach the mounting base 22 to the whipping motor 26.

The whipping chamber 16 further includes one or more indentations (identified by reference numeral 520 in FIG. 5) located in the interior surface of the whipping chamber 16 closest to the impeller surface. In the preferred embodiment, as the impeller 20 reaches its intended speed, the rotation of the fluid begins to reach the speed of the impeller 20. The rotation creates a low pressure region within the whipping chamber 16 nearest to the mixing bowl 14 and causes unwhipped fluid slurry in the mixing bowl 14 to be drawn into the whipping chamber 16. This causes the pressure interior to the whipping chamber 16 (but near the interface between the impeller 20 and chamber wall) to rise as more unwhipped fluid slurry is pulled into the whipping chamber. When the rapidly rotating, higher pressure fluid slurry passes near the interface between the indentations 520 and the whipping chamber 16, a low pressure region near the interface is created due to the indentations 520, which causes cavitations to occur within the fluid.

These cavitations have a two fold effect. First, they cause a greater sheering effect of the fluid slurry than would occur just from the rotating fluid. This sheering effect in turn enhances dissolving and mixing the dry beverage mix 230, 330 in the water. Additionally, the cavitations can create a bubbling or foaming effect in the fluid mixture, which may be desirable for creating the creme or froth needed in serving certain hot beverages. However, those skilled in the art will understand that should frothing not be desirable, the speed of the impeller, or size of the indentations 520 may be adjusted so as to maintain the sheering effect preventing the cavitations.

The impeller 20 may rotate at various speeds, from approximately 8,500 to 17,000 revolutions per minute (RPM), within the whipping chamber 16, depending on a variety of factors including the design of the indentation 520, the type of drink and impeller design. It is important to note that the relationship between the rotational speed of the impeller 20 and the size and shape of the indentations 520 are determined so that cavitation occurs within the whipping chamber 16. A slower impeller rotation may be used with a different indentation configuration and achieve the same result. The same holds true for a higher impeller revolution rate. Those skilled in the art will understand that higher speeds will exaggerate the effect of the present invention and cause more creme or froth to be created, but will also work at lower speeds. In one embodiment, the impeller operates at least about 13,000 rpms.

As the whipping impeller 20 rotates in the whipping chamber 16, the mixed fluid is discharged through an outlet or output 28 due to the higher pressure within the whipping chamber 16 compared to the lower pressure region exterior to the whipping chamber 16.

For a specific type of specialty drink, it may be desirable to increase the time that the fluid is in contact with the impeller/indentation combination. In such case, the pressure interior to the whipping chamber 16 can be increased by placing a restrictor 38 (310 in FIG. 3) at the outlet 28 or within or on the discharge line 215, 315. This increase in pressure is not great enough to reduce any cavitations and increases the contact time between the fluid and the impeller 20 and indentations 520 to create a greater amount of cavitations thereby creating extra creme or froth for the drink.

The chamber 16 as shown in FIG. 4 may be utilized for a specialty drink such as an espresso type drink, and the output restrictor 38 maintains the interior whipping pressure sufficiently high to ensure that the discharged product has a sufficient amount of creme. However, those skilled in the art will understand that a restrictor is not necessary, but may be utilized to enhance the frothing or creme produced.

Figure 5A:
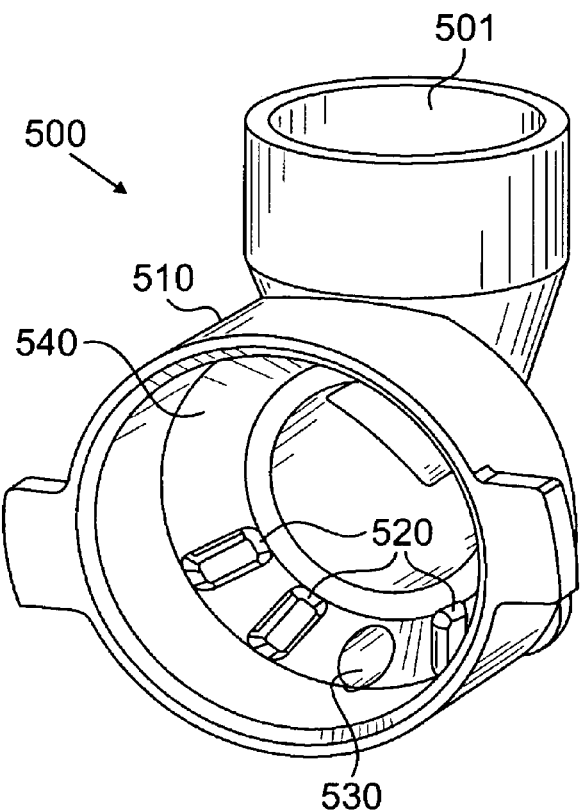
FIG. 5A illustrates the whipping chamber in more detail.

Now turning to FIG. 5A, the whipping or mixing chamber (the term "whipping" and "mixing" may be used interchangeably herein) is illustrated in greater detail. The mixing chamber 500 (225, 335, 16) includes an inlet 501 and a whipping chamber 510. Within the whipping chamber 510 are the one or more indentations 520 and an indentation in the form of a discharge outlet 530. The indentations 520 are formed in an interior surface 540 of the whipping chamber 510.

As mentioned above, one other effect of the cavitations is to create a greater frothing of the mixture. Because of the relative inelasticity of fluid as compared to a fluid/air mixture of froth, the froth is the last to be discharged from the whipping or mixing chamber. This causes the froth to be placed on top of the beverage in the container in the receiving area 235, 335. This presents a very pleasing and appealing presentation of the product to the consumer and is very desirable for certain types of hot beverages that the consuming public purchases, such as lattes, espressos and cappuccinos.

The combination of the indentations in the whipping chamber, the rate of motor speed for the impeller, the impeller configuration, and/or a restriction on the outlet, if utilized, produces the necessary ingredients for the shearing effect and the cavitations produced in the whipping chamber. As mentioned above, these combinations can be varied to produce the same effect. The use of the indentations in the whipping chamber along with the motor speed impeller configurations and restriction on the outlet, combine to achieve reliability and throughput which allows the impeller geometry to be bigger with a smaller pitch. Additionally, a higher degree of quality is maintained in the dispensed fluid due to the dynamic mixing action in the whipping chamber.

Figure 5B:
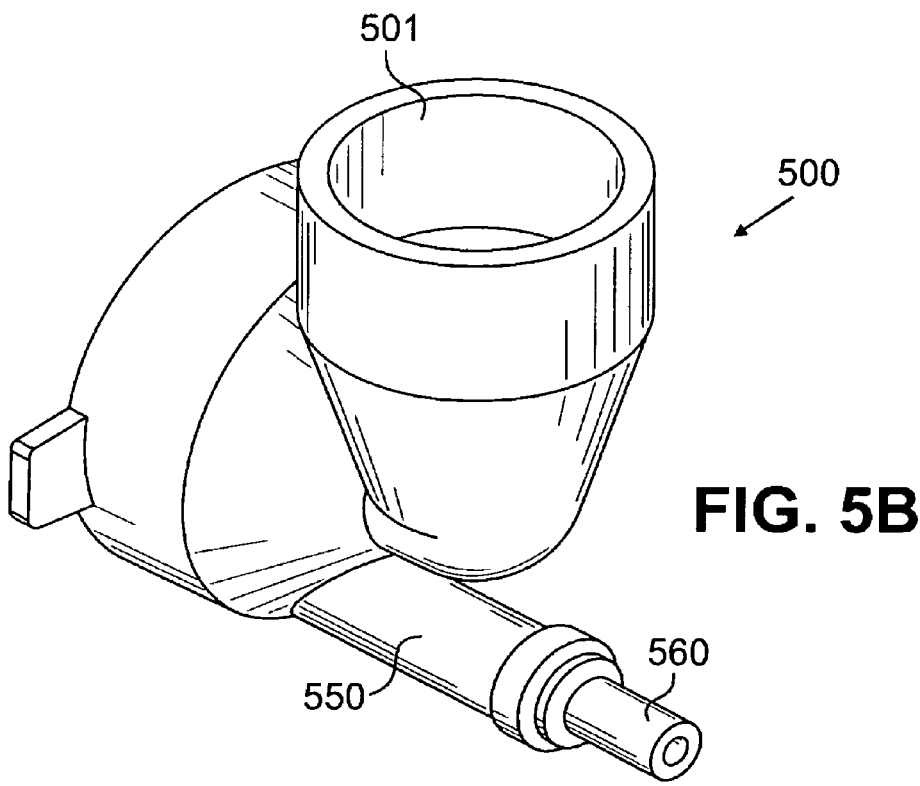
FIG. 5B illustrates the exterior view of the backside of the whipping chamber.

Now turning to FIG. 5B, there is shown an exterior view of the backside of the mixing chamber 500 that includes a discharge outlet 550 and a restrictor 560 (identified as reference numeral 38 in FIG. 4) such as on the end of the discharge outlet 550. As described above, the restrictor 560 restricts the discharge of the fluid from the mixing chamber 500 and creates enough back pressure to cause a greater fluid contact time in the mixing chamber 500 while the fluid is being rotated by the impeller.

Now turning to FIGS. 6A and 6B, there is illustrated front (chamber side) and back (motor side) perspective views of one embodiment of the impeller 20, identified in these Figures by reference numeral 620. The impeller 620 includes two sets of breakers 652, 654 that are angular shaped, and which assist in bringing the fluid up to speed by the impeller 620. The breakers 654 are perpendicular to the breakers 652 and provide the same function of dynamically moving the fluid. Thus, these breakers 652, 654 assist in creating the fluid velocity necessary to mix the slurry and create the cavitations. The impeller 620 further includes structural supports 656 that help support the impeller 620 during revolution. A snap detent groove 660 allows for mechanical attachment of the impeller arm to the whipping motor. The snap detent groove 660 has a "D" shaped positioning registration to assist in proper alignment of the impeller arm to the whipping motor, and provides positive drive while preventing the impeller 620 from slipping during rotation. The flat portion of the "D" configuration is shown by reference numeral 658.

Figure 8A:
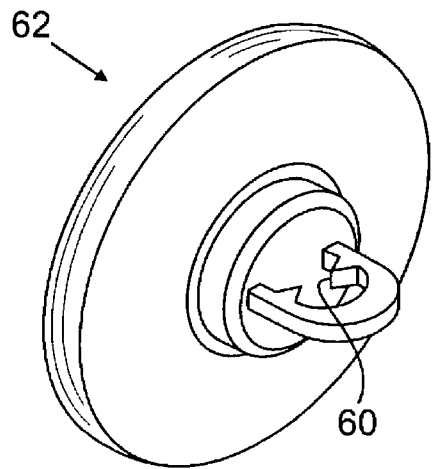
FIGS. 8A and 8B illustrate the mixing chamber side and the motor side, respectively, of another embodiment of an impeller in accordance with the present disclosure.
Figure 8B:
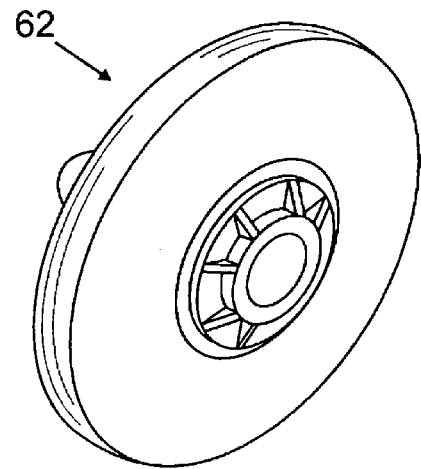

While FIGS. 6A and 6B show one embodiment of an impeller configuration used herein, those skilled in the art will understand that different impeller configurations may be utilized as well. Now turning to FIGS. 8A and 8B, there is illustrated front (chamber side) and back (motor side) perspective views of an alternative embodiment of the impeller 20, identified in these Figures by reference numeral 62. The impeller 62 includes a breaker 60, as shown, that assists in the dynamic fluid movement while the remainder of the impeller 82 remains smooth. The impeller 62 may also have serrations on its edge to assist in fluid movement.

Figure 9A:
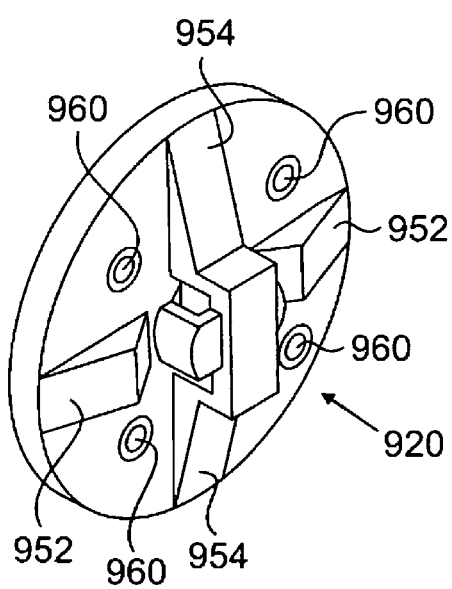
FIGS. 9A and 9B illustrate the mixing chamber side and the motor side, respectively, of an alternative embodiment of an impeller in accordance with the present disclosure.
Figure 9B:
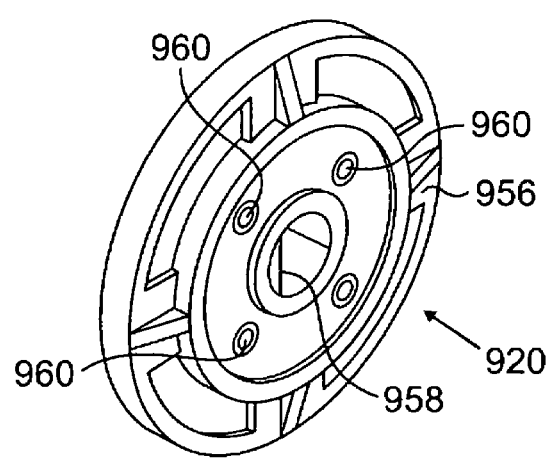

Now turning to FIGS. 9A and 9B, there is illustrated front (chamber side) and back (motor side) perspective views of yet another embodiment of the impeller 20, identified in these Figures by reference numeral 920. The impeller 920 includes two sets of breakers 952, 954, as shown, having an angular shape, and which assist in bringing the fluid up to speed by the impeller 920. The breakers 954 are shown perpendicular to the breakers 952. The impeller 920 further includes structural supports 956 that help support the impeller 920 during revolution.

As will be appreciated, the impeller 920 is substantially similar to the impeller 620 (or the impeller 62) and includes one or more holes or apertures 960, or cavitation mechanisms 960. The one or more cavitation mechanisms 960 are configured as indentations. In one embodiment, the indentations are configured as apertures that extend completely through the impeller 920, while in another embodiment, they are configured or formed as holes in the surface of the impeller wall or surface 962 facing the mixing chamber 510 and do not extend completely therethrough, and having a bottom surface therein.

Now turning to FIGS. 10A, 10B and 10C, there is illustrated a front (chamber side) perspective view (FIG. 10A), a front (chamber side) view (FIG. 10B) and a cross-sectional view (FIG. 10C) along line A-A of FIG. 10B, of another embodiment of the impeller 20, identified in these Figures by reference numeral 1000. The impeller 1000 includes a first front surface 1010 and a second back surface 1020. The front surface 1020 has a number of raised surfaces 1030 (four are shown in FIGS. 10A and 10B), with each surface 1030 including an aperture or hole 1040 therein and extending through the impeller 1000 and to the back surface 1020. Between each of the raised surfaces 1030, and adjacent thereto, are indentations or grooves 1050 within the front surface 1010. As will be appreciated, the indentations or grooves 1050 may be considered as "lowered" surfaces relative to the surfaces 1030. The impeller 1000 may further include a central protrusion or breaker 1060, as shown, that assists in the dynamic fluid movement generated by rotation of the impeller 1000.

It will be understood that the impeller 920, 1000 including the cavitation mechanisms 960, 1040 (which may be in the form of an indentation configured as a hole or aperture) may be utilized within the mixing chamber 500 and whipping chamber 510 (as shown in FIG. 5) or other configuration of the mixing chamber 500 either with or without the indentations 520 in the whipping chamber 510. In one specific embodiment, the impeller 920, 1000 functions with the whipping chamber 510 as shown in FIG. 5, and the combination of the indentations 520 and the one or more holes or apertures 960 within the impeller 920, 1000 provide enhanced agitation, turbulence, cavitations and/or shearing of the fluid slurry resulting in a superior drink quality.

In the embodiment shown in FIGS. 9A and 9B, the one or more holes or apertures 960 include four such cavitation mechanisms each positioned between two adjacent breakers 952, 954. Other configurations and numbers of holes or apertures 960 may be provided, consistent with the teachings herein to provide enhanced agitation, cavitations, shearing and/or turbulence. Similarly, in the embodiment shown in FIGS. 10A, 10B and 10C, the one or more holes or apertures 1040 include four such cavitation mechanisms each positioned between the grooves or indentations (lowered surfaces) 1050. Other configurations and numbers of holes or apertures 1040 may be provided, consistent with the teachings herein to provide enhanced agitation, cavitations, shearing and/or turbulence.

Now turning to FIGS. 7A and 7B, there is provided a cross-sectional side view (FIG. 7A) and an exploded perspective view (FIG. 7B) illustrating various components of one embodiment of the product container or canister 232 (shown in FIGS. 2 and 3) storing the beverage mix 230, 330 (which is hereinafter identified using reference numeral "230").

As illustrated, the product container 232 includes a body 702 (and cover 703) that defines an interior volume 704 for holding the beverage mix 230. The product container includes a mechanism 706 that, when activated, dispenses a portion of the beverage mix 230 through an outlet mechanism 708. The dispensing mechanism 706 includes various components, including outlet components 708, an auger or screw 710 having a spirally wound blade 712 extending along the body of the auger 710, and drive mechanism components 720.

The components 720 provide a coupling mechanism between the auger 710 and a drive mechanism (not shown). When activated, the drive mechanism, such as a motor having a driveshaft, causes the auger to rotate and the beverage mix 230 within the container 232 is driven or forced through an outlet 714 within the body 702, through a straight tube 716 (having a portion of the auger 710 therein) where it falls into the chute 233, 333 and into the inlet 220, 320 of the mixing chamber 225, 325. Alternatively, the chute 233, 333 may be omitted when an elbow tube 218 (as shown) is utilized. In another configuration, both the chute, 233, 333 and the elbow tube 218 or similar components, may be used.

Within the interior volume 702 of the container 232 is a first mixing wheel agitator 730a and a second mixing wheel agitator 730b. Each agitator 730 is circular in shape and includes a number of protrusions or teeth 732 extending around the outer edge of the agitator wheel 730. Spindles or protrusions (not specifically shown) on each side of the wheel agitators 730 are provided and function to hold/position the wheel agitators in place within the container 732, yet allow them to rotate about a fixed axis point. Various additional or different attachment/connection means or structures and corresponding structures provided inside the container 232 may be used, as readily understood to those skilled in the art, to secure and/or position the wheel agitators in the desired location(s).

Figure 7A:
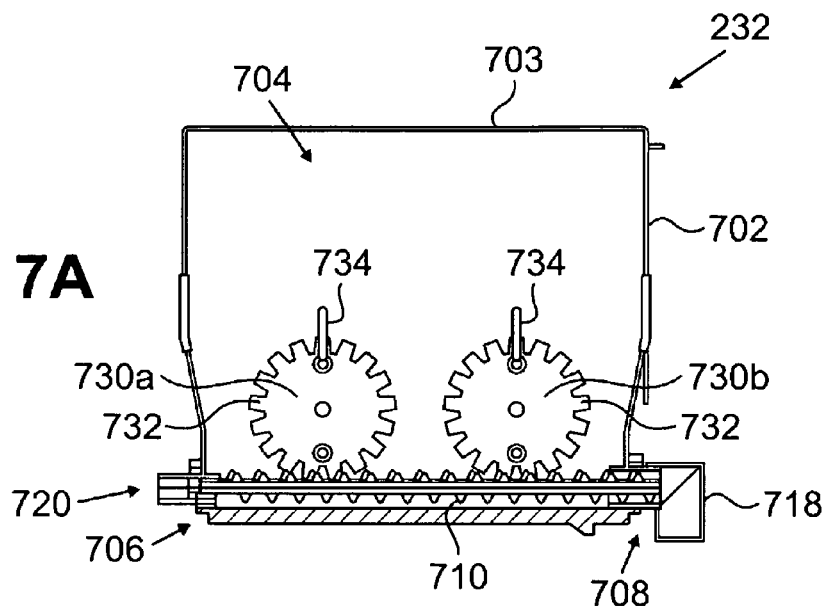
FIGS. 7A and 7B illustrate a cross-sectional side view (FIG. 7A) and an exploded perspective view (FIG. 7B) illustrating various components of one embodiment of the product container or canister shown in FIGS. 2 and 3)
Figure 7B:
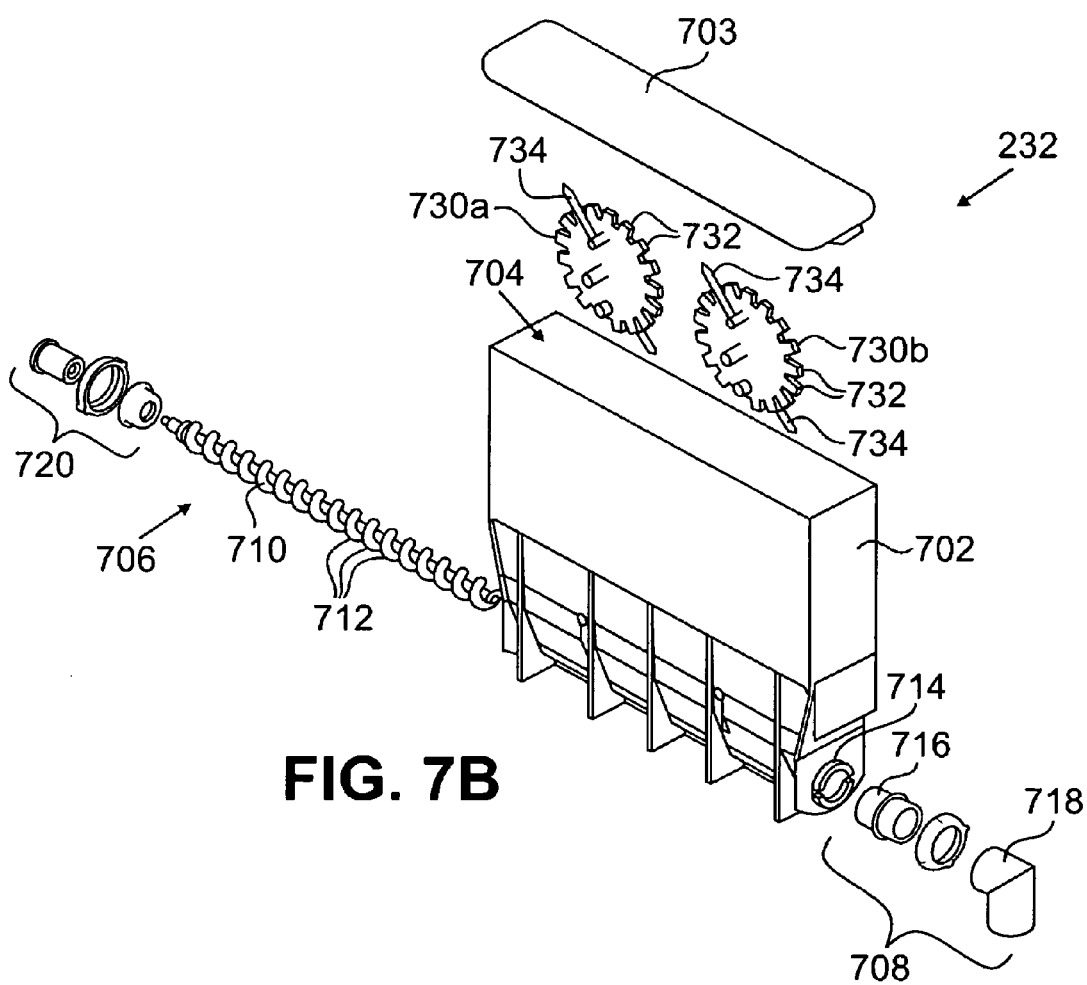

In the embodiment shown in FIGS. 7A, 7B, the two agitator wheels 730 are positioned near the bottom of the container 732 just above the auger 710. The teeth 732 of each respective wheel agitator 730 engages with the spiral blade of the auger 710. As the auger 710 rotates, the wheel agitators 730 rotate. It will be understood that in the embodiment shown, the auger 710 provides the drive mechanism for activating and rotating the wheel agitators 730. In another embodiment (not shown), one or more separate drive mechanism(s) may be utilized. In other embodiments, one or more additional agitator wheels 730 may be used.

Each wheel agitator 730 includes one or more mixing protrusions 734 connected thereto that may extend laterally, radially and/or longitudinally from the wheel agitator 730. As the wheel agitators 730 move or rotate, the protrusions 734, along with the teeth 732, function to displace the beverage mix 230 within lower portion of the container 232. This displacement or movement of the beverage mix 230 within the container 232 keeps the product loose and lifted, resulting in a more evenly distributed product feed into the auger 710 for a more level evacuation of the product. Thus, the gram throw of the beverage mix 230 is more consistent as the level of the product 230 diminishes within the container 232. This provides significant operations benefits by increasing the effective product capacity of the container 232 and reducing the service frequency needed to replenish the contents (beverage mix 230) of the container 232.

Figure 11:
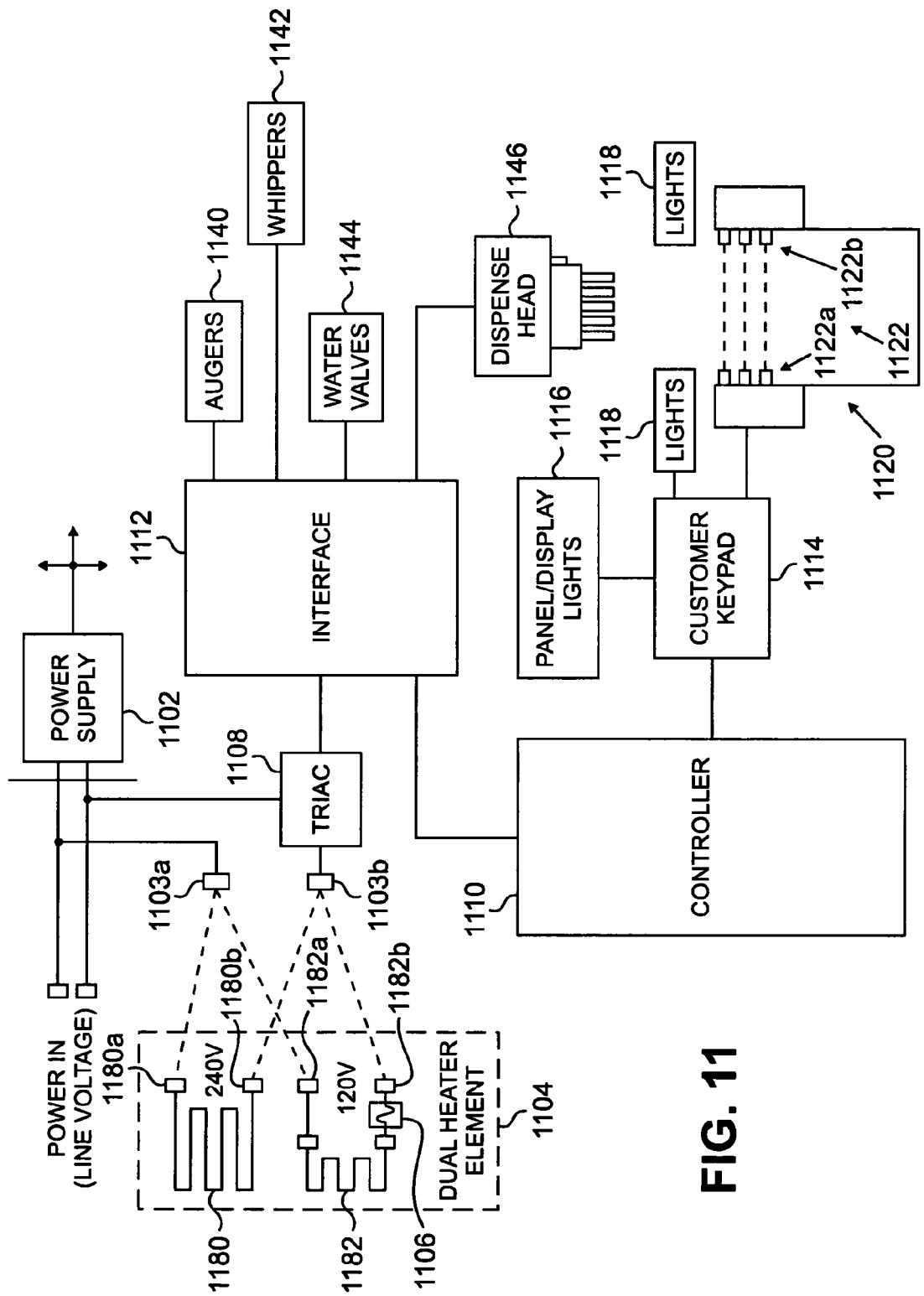
FIG. 11 is a block diagram illustrating various components and systems within the vending apparatus.

Now turning to FIG. 11, there is provided a block diagram illustrating various components and systems within the vending apparatus 100. Though illustrated in a specific configuration and with specific components, other configurations and additional or different components are contemplated and may be used.

Electrical power (Power In or line voltage) is received at two line voltage input terminals and supplied from an electrical power source (not shown) such as an alternating current (AC) voltage source. A power supply 1102 (e.g., a switching power supply) converts the AC line voltage to direct current (DC) voltage and supplies the resulting DC voltage to devices and components within the vending apparatus 100. As will be appreciated, most of the motors, circuitry and other devices are designed to operate at 24 VDC, though other operating voltages may be utilized.

Though not shown, the vending apparatus 100 includes a hot water tank that supplies hot water (or other liquids) for use in the vending process. The AC line voltage also powers a heater 1104 for heating water in the tank. The line voltage is coupled to a first heater input terminal 1103*a* and a second heater input terminal 1103*b*. These two terminals supply the line voltage to the heater 1104. Other components may be included that condition or operate on the line voltage, such as a main switch, fuse(s) and a line voltage filter (none shown).

The heater 1104 includes a first heating element 1180 that operates at a first voltage or voltage range (first operating voltage) and a second heating element 1182 that operates at a second voltage or voltage range (second operating voltage). In one specific embodiment, the first element 1180 operates at 230 VAC (or within the normal operating range for 230 VAC) while the second element 1182 operates at 120 VAC (or within the normal operating range for 120 VAC). In one embodiment, the intended first operating voltage is between about 210-240 VAC while the intended second operating voltage between about 100-130 VAC. The rated wattage for each element 1180, 1182 may be the same or different. In one example, the first element 1180 provides 2000 watts at 230 VAC and the second element 1182 provides 1250 watts at 120 VAC.

The configuration of the line voltage electrical system and the use of a heater with dual elements each operating (normal operation) at different voltages or voltage ranges allows the vending apparatus 100 to be manufactured without variation in components and enables dual voltage source operation (e.g., line voltage supply is either 120 VAC or 230 VAC or within these normal ranges). When it is desired for the vending apparatus to operate using 230 VAC (line voltage), the terminals (1180*a*, 1180*b*) of the first heating element 1180 are connected to the terminals 1103*a*, 1103*b*, while the terminals (1182*a*, 1182*b*) of the second heating element 1182 remain disconnected. Similarly, to operate using 120 VAC (line voltage), the terminals (1182*a*, 1182*b*) of the second heating element 1182 are connected to the terminals 1103*a*, 1103*b*, while the terminals (1180*a*, 1180*b*) of the first heating element 1180 remain disconnected. This is illustrated by the two sets of dotted lines in FIG. 11. Thus, the two sets of terminals 1180*a*, 1180*b* and 1182*a*, 1182*b* are interchangeably connectable to the terminals 1103*a*, 1103*b*—in response to the desired operating voltage.

To accomplish connection of one or the other, the terminals 1103*a*, 1103*b* may be coupled to a flexible wiring harness having a predetermined connector configuration. Meanwhile, the terminals 1180*a*, 1180*b* and terminals 1182*a*, 1182*b* will having a corresponding connector 1186 and 1190, respectively (see FIGS. 12*a*-12C) for mating with the connector associated with terminals 1103*a*, 1103*b*. Depending on the value of the line voltage, the connections to the appropriate terminals (1180*a*/1180*b* or 1182*a*/1182*b*) would be made.

As shown in FIG. 11, a triac (triode for alternating current) 1108 is connected between the line voltage and the terminal 1103*b*. The triac 1108 provides a low voltage switch to turn on/off the heater 1104. A fuse circuit 1106 may also be provided in line with one of the terminals 1182*a*, 1182*b* of the second heating element 1182. As will be appreciated, connection of the 240 VAC heating element to 120 VAC line voltage will not likely damage the heating element, however, connection of the 120 VAC heating element to 230 VAC line may cause damage to the heating element. For example, a fifteen amp fuse (rated to blow if the first operating voltage is applied to the second heating element 1182) may be included, as shown, for overcurrent/overvoltage protection. The fuse circuit 1106 may be included within the heating element 1182 or constructed as a separate component connected between the respective terminals.

Use of the dual element heater 1104 in a vending apparatus as described herein provides several benefits. First, a manufacturer of the vending apparatus may assemble all machines (whether for 120 VAC or 230 VAC line voltages) without variation. Second, an owner or customer (of the vending apparatus) may order, obtain, and use the same vending apparatus for different markets (e.g., 120 VAC or 230 VAC), and switch from one market to another market with minimal change. Other advantages and benefits may be readily apparent to those skilled in the art.

Figure 12C:
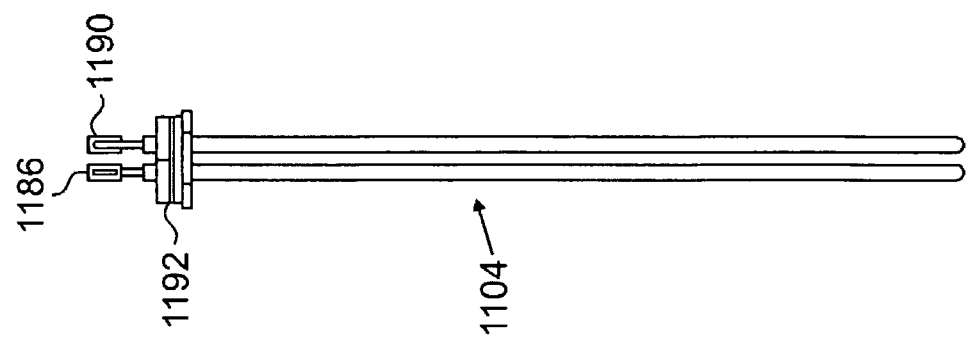
FIGS. 12A, 12B and 12C illustrate in more detail a perspective (FIG. 12A), a front (FIG. 12B) and a side view (FIG. 12C) of the dual heater element shown in FIG. 11.
Figure 12B:
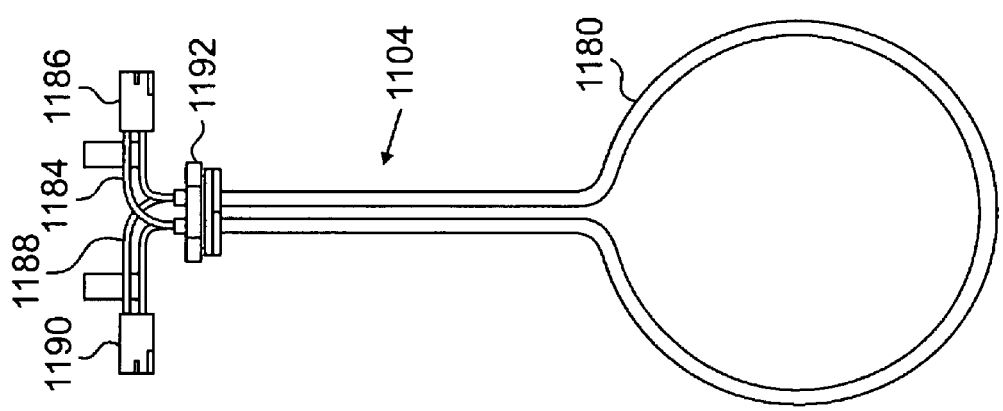
Figure 12A:
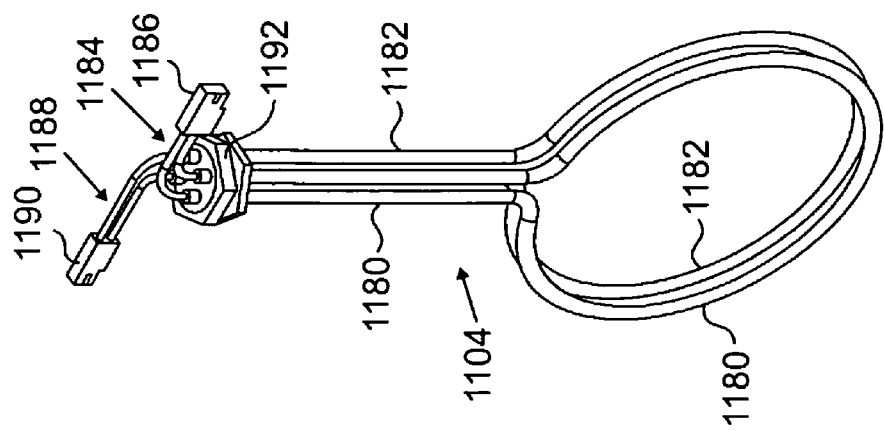

Now turning to FIGS. 12A, 12B and 12C, there are illustrated a perspective (FIG. 12A), a front (FIG. 12B) and a side view (FIG. 12C) of the dual heater 1104.

The heating element 1180 includes a resistive heater element, lead wires 1184 (conductors) and a lead connector 1186. The lead connector 1186 houses the terminals 1180*a*, 1180*b*. The heating element 1182 includes a resistive heater element, lead wires 1188 (electrical conductors) and a lead connector 1190. The lead connector 1190 houses the terminals 1182*a*, 1182*b*. The dual heater device 1104 includes a bulkhead connector mechanism 1192 for securing the dual heater through, and to, a wall of the hot water tank.

As will be appreciated, prior to operation and depending on the rated line voltage for use with the vending apparatus 100, one of the lead connectors 1186, 1190 (with its respective terminals) is coupled to the line voltage terminals 1103*a*, 1103*b*. The terminals and connectors are configured so that only one lead connector may be connected to the terminals 1103*a*, 1103*b* at anytime. When 230 VAC mode of operation is desired, the lead connector 1186 is connected (and the other lead connector 1190 is left disconnected) to the line voltage terminals 1103*a*, 1103*b*. When 120 VAC mode of operation is desired, the lead connector 1190 is connected (and the other lead connector 1186) is left disconnected). In the 230 VAC mode, the first heater element 1180 receives electrical power and heats (when activated) water in the tank. In the 110 VAC mode, the second heater element receives electrical power and heats (when activated) water in the tank. It will be understood that one of the connectors 1186, 1190 may be directly connected to the terminals 1103*a*, 1103*b* or a separate device with two electrical conductors (e.g., a harness having two connectors) may be connected between one of the connectors 1186, 1190 and the terminals 1103*a*, 1103*b*, to provide the electrical connection between the heating element 1180 or 1182 and the line voltage (through the terminals 1103*a*, 1103*b*). Such devices may include wires, one or more mechanical, electromechanical or electrical switches, or a device operable to sense the line voltage and function to selectively provide electrical connection between the appropriate heating and the line voltage (e.g., voltage sensor/switch), and the like. Such devices function to electrically connect one of the heating elements to the line voltage while disconnecting the other.

In one embodiment (not shown), a voltage detector is provide to detect the magnitude of the line voltage and for operating a switch that selectively connects the appropriate heating element to the line voltage. This switch may be a three-position switch that provides one of the following: no connection to the line voltage, connection between the heating element 1180 and the line voltage, or connection between the heating element 1182 and the line voltage. Alternatively, the vending apparatus 100 may be programmed (such as using the controller 1110) immediately prior to operation at the place of setup (through the customer keypad interface or other input device) with the value of the line voltage that the vending apparatus will utilize. Once input, the vending apparatus determines the heating element to utilize. Prior to programming, the heating elements 1180, 1182 would be disconnected and after programming, the proper heating element would be connected to the line voltage.

The dual heater 1104 is operable for generating heat (e.g. for heating water or other liquid in a tank) using a first heating element when line voltage to the vending apparatus is at a first operating voltage (or voltage range) and using a different and separate heating element when line voltage to the vending apparatus is at a second operating voltage (or voltage range). The first operating and second operating voltages are different, and in one specific embodiment, are 230 VAC and 120 VAC. In other words, one of heating elements—either 1180 or 1182—is connected to the line voltage depending on whether a 230 VAC or 120 VAC line voltage will power the vending apparatus 100.

Though not shown specifically, the heater 1104 (and the two heating elements) passes through a single opening within a wall of the tank. Two openings may be used, if desired, though the configuration of the heater shown in the Figures is beneficial in that it allows a single opening to be used.

Turning back to FIG. 11, the vending apparatus 100 further includes a controller 1110, an interface 1112, a customer input device or keypad 1114, and a container detection mechanism that detects the size of a container placed within in the dispensing or receiving area 120, 235.

The controller 1110 provides control and vending processing functions. The controller 1110 may typically include a processor and associated circuitry (not shown). It will be understood that various hardware and firmware/software may be used by those skilled in the art to construct the controller 1110 in order to provide any necessary or inherent functionality, or express functionality described herein.

The interface 1112 includes circuitry that responds to control signals received from the controller 1110 and activates and controls one or more devices or components, such as the triac 1108 (for activating the water heater element 1104), augers 1140 (for dispensing dry mix), whippers 1142 (for whipping a slurry mix), water valves 1144 (for supplying water) and a dispense head 1146 (for dispensing the selected beverage into a container or cup).

The customer input device 1114 receives selection and other input information from a customer during a vend operation. The customer input device 1114 may also control one or more external panel/display lights 1116 visible to the customer. For example, the lights 1116 may illuminate one or more buttons or specific input mechanisms of the input device 1114. One or more dispensing area lights 1118 positioned to illuminate the beverage cup receiving area 1120 (120, 235) may be controlled by the customer input device 1114. Alternatively, the controller 1110 may control directly (or indirectly) the external panel/display lights 1116 and the lights 1118.

Positioned proximate the beverage cup receiving area 1120 (120, 235) are a plurality of sensors 1122. Each sensor 1122 includes an emitter 1122*a* for emitting light and a detector 1122*b* for detecting the emitted light. Each emitter 1122 emits a light beam that is directed to and received by its corresponding detector 1122*b*. The emitter/detector sensor pairs 1122 detect the presence/absence of an object within the receiving area 1120 (120, 235). The term "light" may include visible, non-visible or other electromagnetic radiation. Though one specific embodiment of the sensors is shown, other types of sensors may be used to detect the cup placement and cup size.

More specifically, the plurality of emitter/detector pairs 1122 function to detect container/cup size. In the embodiment shown in FIG. 11, three pairs are shown, though two or more pairs may be utilized. With use of the detectors 1122, various sizes of containers/cups placed within the receiving 1120 (120, 235) below the dispensing head 1146 may be detected or determined.

A first pair (lower) positioned below the other two pairs functions to detect a "small" cup size. A second pair (middle) functions to detect a "medium" cup size, while a third pair functions to detect a "large" cup size. The term "size" generally refers to the volume or capacity of the cup. Different cup sizes may be detected by detecting different dimension(s) of the cup. In the embodiment shown, one of three possible cup height is detected, thus denoting a small, medium or large capacity cup. In other embodiments, different or additional dimensions may be detected, such as width (width of cup denoting capacity). Depending on the size of the cup, light emitted from the emitters of one, two or all three sensors is blocked which prevents reception by the corresponding detector. Depending on which sensors detect blockage, the appropriate cup size may be ascertained.

Figure 13A:
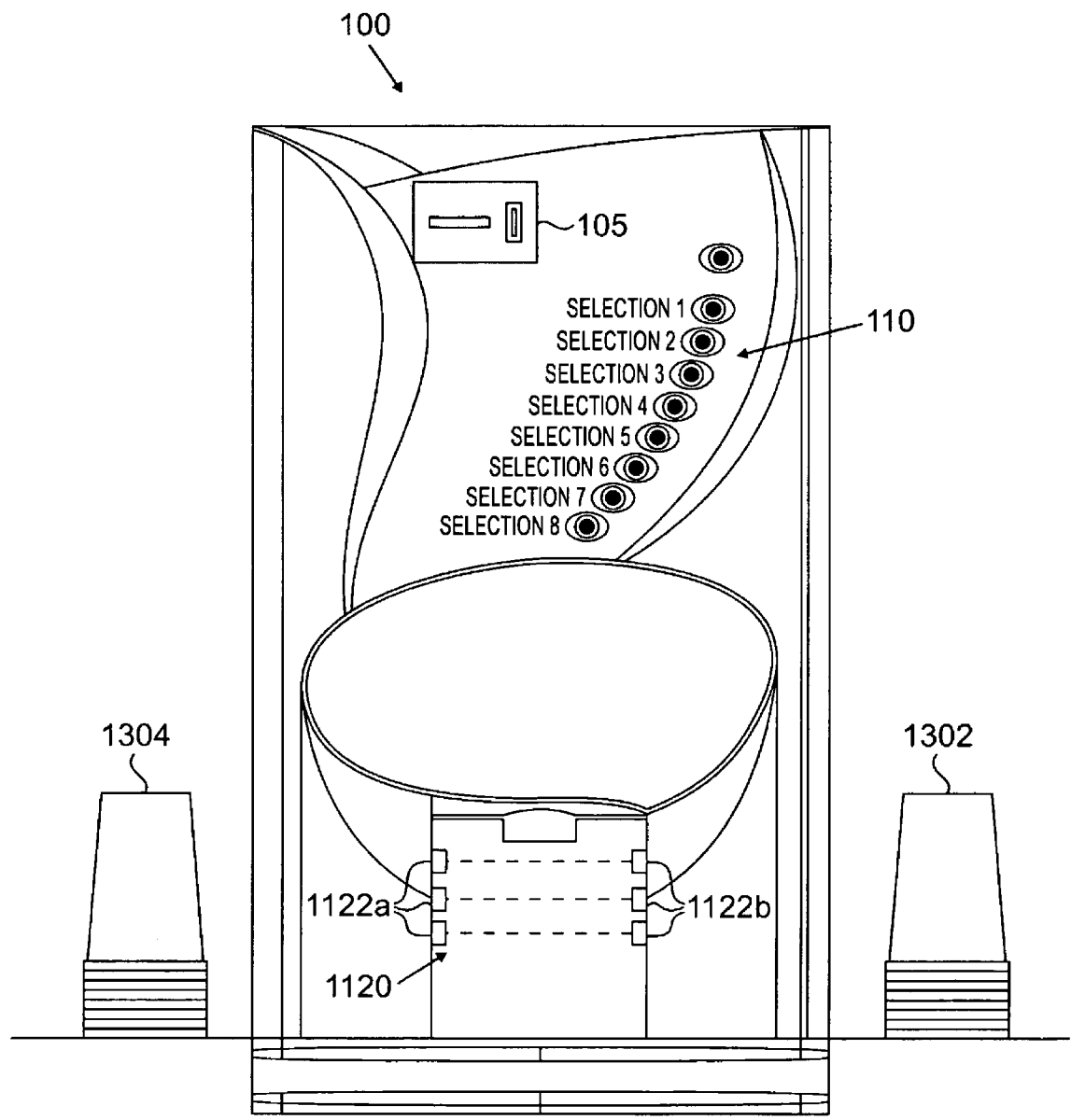
FIG. 13A illustrates a more detailed diagram of the front (user interface) of an example vending apparatus.

Now turning to FIG. 13A, there is illustrated a more detailed diagram of the front of an example vending apparatus 100. The customer input device 110 includes multiple selection buttons (for Selections 1 through 8). Other buttons may be included. The buttons include functionality for illumination of the button (or a point near the button). In this FIGURE, the buttons are shown as not illuminated. These buttons generally form part of the panel/display lights 1116 shown in FIG. 11. Positioned adjacent the vending apparatus 100 are a first stack of cups including a plurality of "small" capacity cups 1302 and a second stack of cups including a plurality of "large" capacity cups 1304. Additional "medium" capacity cups (not shown) may also be provided.

The receiving area 1120 (120, 235) is shown with three pairs of sensors 1122, with each pair including an emitter 1122a and a detector 1122b.

Figure 13B:
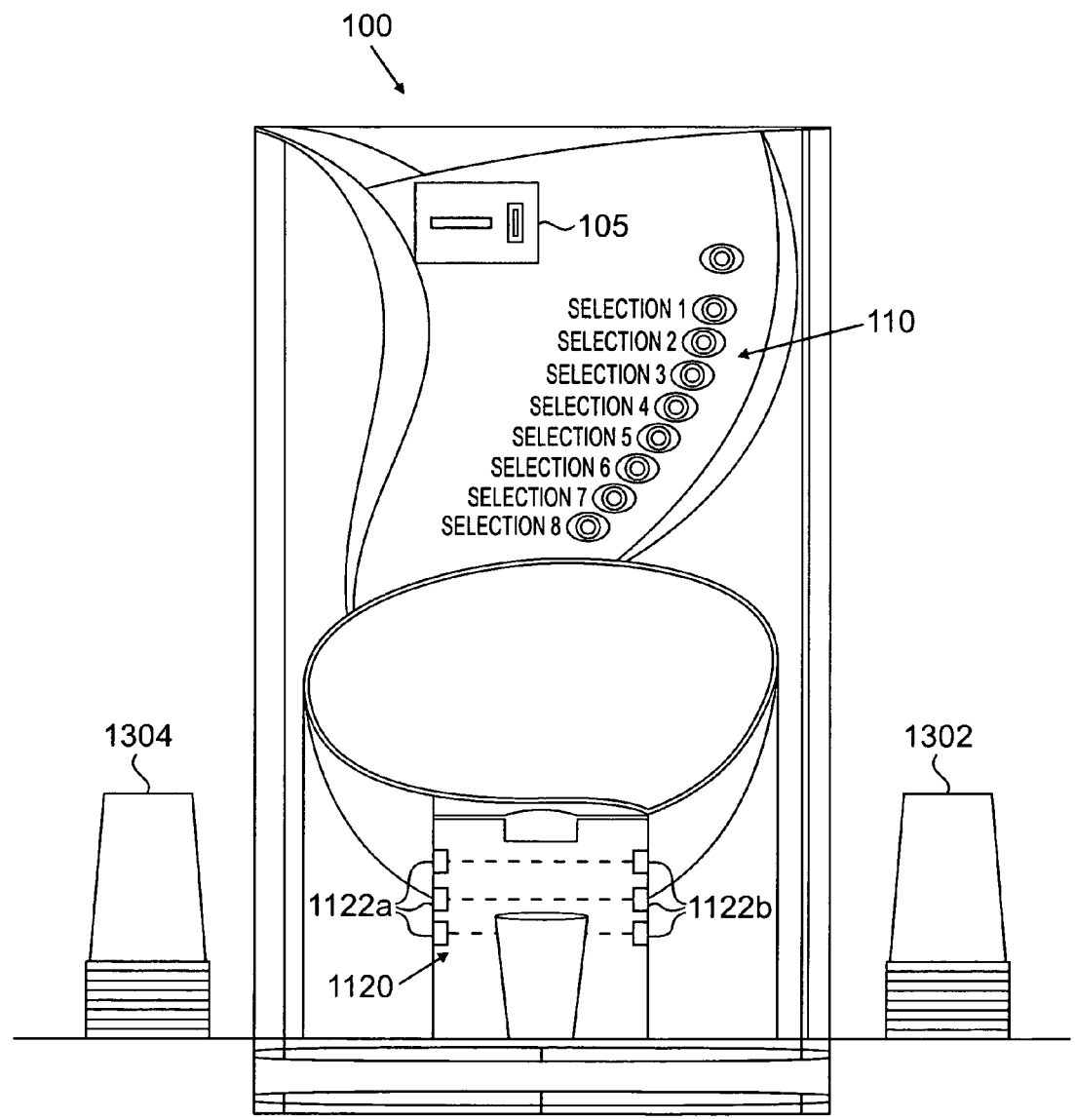
FIGS. 13B and 13C illustrates the front (user interface) of an example vending apparatus at two respective points during an example customer selection and vending process.

Now turning to FIG. 13B, there is illustrated the same example vending apparatus 100 shown in FIG. 1 with a "small" capacity cup placed in the receiving area 1120 (120, 235). At this point in the vend process, the customer has selected the amount (e.g., small, medium or large) of the beverage desired. By selecting and positioning the "small" cup 1302 in the receiving area, the customer has selected to receive a "small" beverage.

As shown in FIG. 13B, the cup 1302 blocks or prevents light emitted from the lower emitter 1122a from being detected at the corresponding detector 1122b. Light emitted from the middle and upper emitters 1122a remains unblocked and is detected by their corresponding detectors 1122b. As a result, placement of the cup 1304 into the receiving area 1120 is detected. Further, the size of the cup 1304 is detected or determined based on the passing or blockage of light received by the various detectors 1122b. Depending on the desired processing and functionality therein, either the customer device 1114 or the controller 1110 (see FIG. 11) may receive and process signals from the sensors 1122 to determine the size of the placed cup and control the panel/lights 1116 (and the selection apparatus 110).

After cup size is detected, information is conveyed to the customer indicating which of the overall selections (selections 1 through 8) are available for that chosen cup size. In most cases, the available selections will be all of the selections (i.e., all selections available in that size beverage). However, there may some instances when a beverage is unavailable in the chosen size (i.e., only in "large" size). With continued reference to FIG. 13B, this diagram further illustrates that all selection buttons 110 are available in the "small" size. Thus, all buttons are shown illuminated.

Figure 13C:
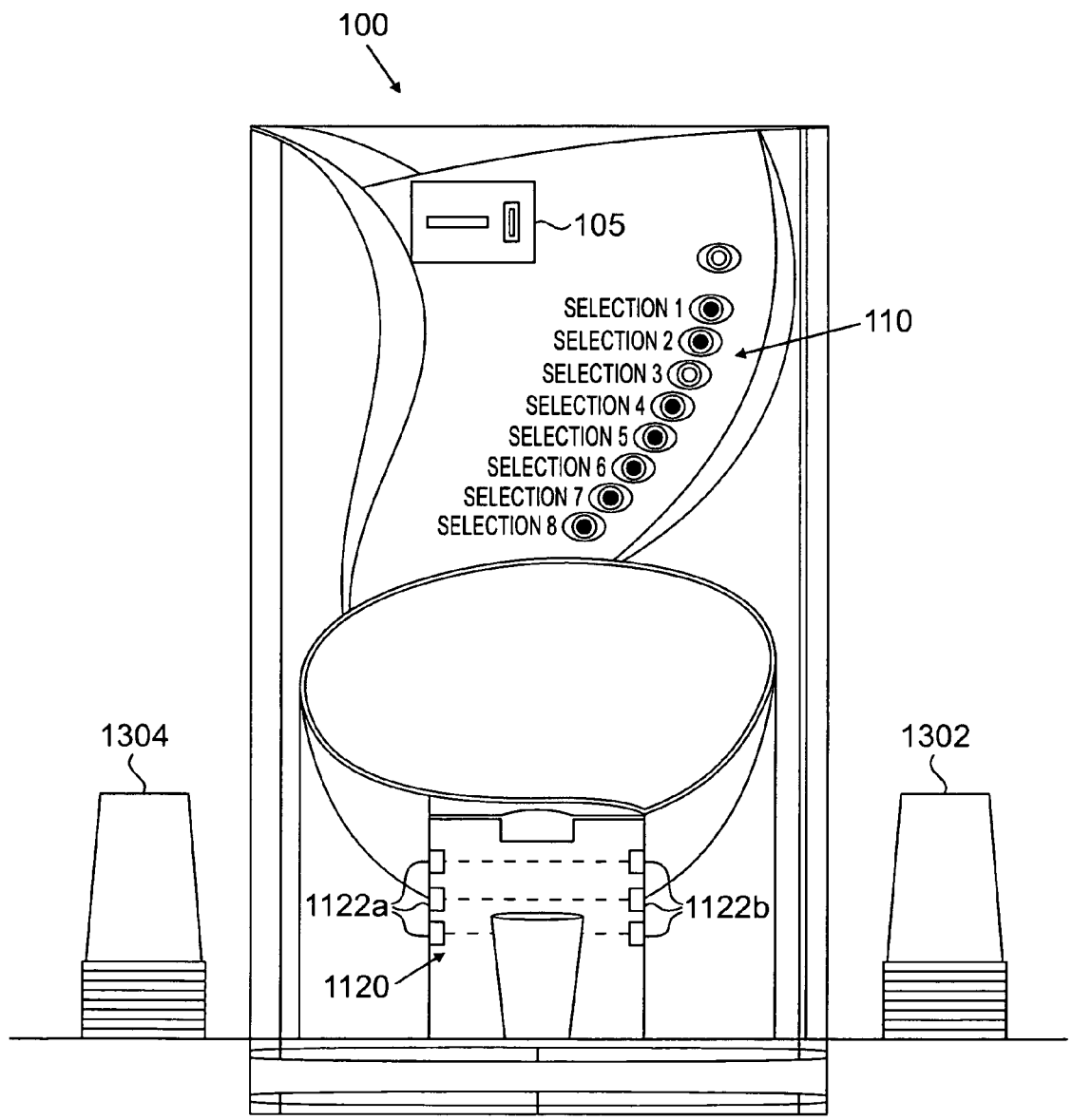

After cup size is detected and the available beverage selections are indicated (and presumably after the customer has deposited payment for the product), the customer will select the desired beverage by depressing one of the illuminated selection buttons 110. Once selected, the vending apparatus 100 processes the selection by making the selected beverage and ultimately dispenses the beverage into the cup 1304. Because the vending apparatus 100 has automatically detected the size of the cup placed in the receiving, the vend process mixes and dispenses the appropriate amount of beverage. After selection by the customer, the user interface of the vending apparatus 100 ceases illumination of all other possible beverage selections and illuminates only the actual beverage selected. This is illustrated in FIG. 13C in which the customer is shown to have selected Selection 3.

Figure 14:
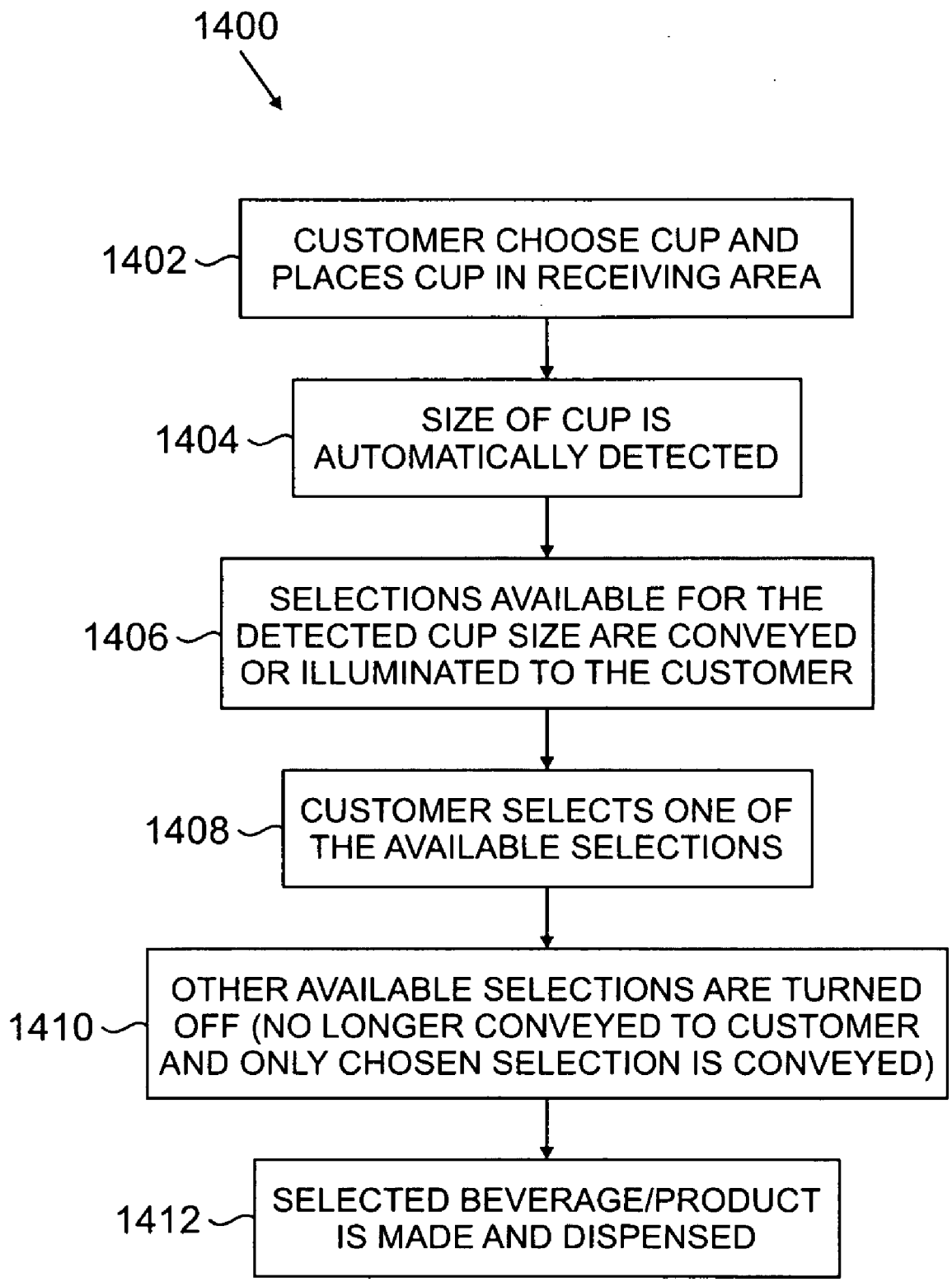
FIG. 14 shows a basic method of a customer selection and beverage vending process 1400 in accordance with the present disclosure.

Now turning to FIG. 14, there is shown a basic method of a customer selection and beverage vending process 1400 in accordance with the present disclosure. At the onset, a customer chooses a cup (e.g., 1302, 1304) from a plurality of cups having different sizes and places the cup in the receiving area 1120 of the vending apparatus 100 (step 1402). It will be appreciated that payment by the customer occurs at some point in the process 1400 which may occur at various points in the process, as desired. It will also be understood that the plurality of cups having different sizes will usually be located adjacent the vending apparatus 100 (or may be stored in a container attached to thereto).

After placement of the cup, the size of the cup is detected by one or more sensors 1122 positioned within the receiving area 1120 (step 1404). In one embodiment, the three difference sizes (small, medium and large) may be differentiated.

After the size of the placed cup is detected, the vending apparatus 100 determines which selections (of the overall possible selections) are available for the detected cup size and the available selections are illuminated or otherwise conveyed to the customer (step 1406). As will be appreciated, those available selections may also not include a selection that would normally be available for that cup size, but is unavailable due to another reason (e.g., the mix or beverage is "sold out").

Out of those available selections, the customer selects the desired selection (step 1408). Upon selection, the other selections that were previously illuminated or otherwise available for selection are shown as no longer available, and only the chosen selection is illuminated (i.e., the customer is made aware of the chosen selection)) (step 1410). In response to the selection, the vending apparatus 100 makes and dispenses the selected beverage/product into the cup (step 1412). Generally, the components illustrated in FIG. 11 and throughout this application function to control the beverage vending process.

This process provides for an enhanced yet simplified customer selection process experience because the customer no longer needs to input the cup size in the customer's selection process. Simply placing a cup (of the desired size) in the receiving area 1120 is all that is necessary. This eliminates the need for the customer to manually select or input a cup size.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A heating apparatus for use in a vending machine, the heating apparatus comprising:

a pair of power supply terminals operable for receiving an operating line voltage for use in providing power to the vending machine;

a first heating element having a first pair of electrical conductors and rated for operation at a first operating voltage;

a second heating element having a second pair of electrical conductors and rated for operation at a second operating voltage; and means for selectively coupling the pair of power supply terminals to a one of: the first pair of electrical conductors when the vending machine is intended to use the first operating voltage as the operating line voltage and the second pair of electrical conductors when the vending machine is intended to use the second operating voltage as the operating line voltage.

2. The heating apparatus in accordance with claim 1 wherein the operating line voltage is in the form of volts alternating current (VAC).

3. The heating apparatus in accordance with claim 2 wherein the first operating voltage is between about 210-240 VAC and the second operating voltage is between about 100-130 VAC.

4. The heating apparatus in accordance with claim 3 wherein the first operating voltage is about 230 VAC and the second operating voltage is about 120 VAC.

5. The heating apparatus in accordance with claim 3 further comprising a fuse electrically connected between one of the pair of electrical conductors of the second heating element and one of the pair of power supply terminals to provide overvoltage/overcurrent protection.

6. The heating apparatus in accordance with claim 1 further comprising:
 a voltage detector operable for detecting magnitude of the line voltage; and
 wherein the means for selectively connecting comprises a switch responsive to the detected line voltage.

7. A method of manufacturing a vending machine apparatus, the method comprising:
 providing a pair of power supply terminals operable for receiving an operating line voltage for use in providing power to the vending machine;
 providing a first heating element having a first pair of electrical conductors and operable at a first operating voltage;
 providing a second heating element having a second pair of electrical conductors and operable at a second operating voltage; and
 selectively coupling the pair of power supply terminals to a one of: the first pair of electrical conductors when the first operating voltage is to be used as the operating line voltage and the second pair of electrical conductors when the second operating voltage is to be used as the operating line voltage.

8. The method in accordance with claim 7 further comprising:
 passing at least a portion of the first and second heating elements through a single opening within a wall of a liquid storage tank.

9. The method in accordance with claim 7 wherein the first operating voltage is between about 210-240 VAC and the second operating voltage is between about 100-130 VAC.

10. The method in accordance with claim 9 further comprising:
 detecting whether the line voltage substantially equals the first operating voltage or the second operating voltage; and
 selectively connecting the pair of power supply terminals based on the detected line voltage.

11. A vending apparatus for providing a heated beverage, the vending apparatus comprising:
 a pair of input line voltage terminals operable for receiving power from an external voltage source;
 a tank for holding a liquid;
 a heater disposed at least partially within the tank for heating the liquid in the tank, the heater comprising,
  a first heating element having a first pair of electrical conductors,
  a second heating element having a second pair of electrical conductors;
 a mixing chamber for mixing a portion of the liquid from the tank and a beverage mix to generate a heated beverage;
 an outlet for dispensing the heated beverage into a receptacle; and
 wherein when the external voltage source is within a first operating voltage range the pair of input line voltage terminals are coupled to the first pair of electrical conductors of the first heating element and the second pair of second pair of electrical conductors of the second heating element are not coupled to the input line voltage terminals or any other power source.

12. The vending apparatus in accordance with claim 11 wherein when the external voltage source is within a second operating voltage range the pair of input line voltage terminals are coupled to the second pair of electrical conductors of the second heating element and the first pair of second pair of electrical conductors of the first heating element are not coupled to the input line voltage terminals or any other power source.

13. The vending apparatus in accordance with claim 12 wherein the first operating range is between about 210-240 VAC and the second operating voltage range is between about 100-130 VAC.

14. The vending apparatus in accordance with claim 13 further comprising:
 a voltage detector operable for detecting magnitude of the external voltage source; and
 a switch for selectively coupling, responsive to the detected external voltage source, the first pair of conductors of the first heating element to the pair of input line voltage terminals when the external voltage source is within the first operating voltage range and coupling the second pair of conductors of the second heating element to the pair of input line voltage terminals when the external voltage source is within the second operating voltage range.

15. A vending system for providing a heated beverage, the vending system comprising:
 a customer input system for receiving a customer input for the heated beverage;
 a dry beverage mix product dispensing apparatus storing dry beverage mix therein and operable for dispensing a predetermined portion of the dry beverage mix;
 a tank for holding a liquid;
 a mixing chamber for mixing a portion of the liquid from the tank and the dispensed dry beverage mix portion into a heated beverage;
 a discharge outlet from the mixing chamber to dispense the heated beverage into a customer receptacle; and
 a pair of power supply terminals for receiving an operating line voltage for use in providing power to the vending system;
 a heater apparatus for heating liquid in the tank, the heater apparatus comprising,
  a first heating element having a first pair of electrical conductors for operation at a first operating voltage,
  a second heating element having a second pair of electrical conductors for operation at a second operating voltage, and
  means for selectively coupling the pair of power supply terminals to a one of: the first pair of electrical conductors when the operating line voltage substantially equals the first operating voltage and the second pair of electrical conductors when the operating line voltage substantially equals the second operating voltage.

16. The vending system in accordance with claim 15 wherein the operating line voltage is in the form of volts alternating current (VAC).

17. The vending system in accordance with claim 16 wherein the first operating voltage is between about 210-240 VAC and the second operating voltage is between about 100-130 VAC.

18. The vending system in accordance with claim 17 wherein the first operating voltage is about 230 VAC and the second operating voltage is about 120 VAC.

19. The vending system in accordance with claim 17 further comprising a fuse electrically connected between one of the pair of electrical conductors of the second heating element and one of the pair of power supply terminals to provide overvoltage/overcurrent protection.

20. The vending apparatus in accordance with claim 15 further comprising:
- a voltage detector operable for detecting magnitude of the line voltage; and
- wherein the means for selectively connecting comprises a switch responsive to the detected line voltage.

* * * * *